(12) United States Patent
Nagao (10) Patent No.: US 12,193,129 B2
(45) Date of Patent: Jan. 7, 2025

(54) LIGHT EMITTING ELEMENT DRIVING DEVICE

(71) Applicant: Rohm Co., Ltd., Kyoto (JP)

(72) Inventor: Kei Nagao, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 112 days.

(21) Appl. No.: 17/781,836

(22) PCT Filed: Aug. 26, 2020

(86) PCT No.: PCT/JP2020/032148
§ 371 (c)(1),
(2) Date: Jun. 2, 2022

(87) PCT Pub. No.: WO2021/111682
PCT Pub. Date: Jun. 10, 2021

(65) Prior Publication Data
US 2023/0007757 A1    Jan. 5, 2023

(30) Foreign Application Priority Data

Dec. 6, 2019   (JP) ................................ 2019-221247

(51) Int. Cl.
*H05B 47/19*   (2020.01)
*B60Q 1/26*    (2006.01)
(Continued)

(52) U.S. Cl.
CPC ............. *H05B 47/19* (2020.01); *H05B 45/10* (2020.01); *B60Q 1/2607* (2013.01); *B60Q 1/30* (2013.01)

(58) Field of Classification Search
None
See application file for complete search history.

(56) References Cited

U.S. PATENT DOCUMENTS 9,204,523 B2 * 12/2015 Reed .................. H05B 47/1965
10,278,244 B1 * 4/2019 Bahrehmand ........ H05B 45/325
(Continued)

FOREIGN PATENT DOCUMENTS

| JP | 2004-247856 |   | 9/2004 |
|----|-------------|---|--------|
| JP | 2004247856 A | * | 9/2004 |

(Continued)

OTHER PUBLICATIONS

International Search Report in International Appln. No. PCT/JP2020/032148, dated Oct. 20, 2020, 5 pages (with English Translation).

*Primary Examiner* — Srinivas Sathiraju
(74) *Attorney, Agent, or Firm* — Fish & Richardson P.C.

(57) ABSTRACT

A light emitting element driving device includes a receiver that receives a predetermined communication signal transmitted across a communication line, a generator that generates a reference signal based on the start time point of a start bit in the predetermined communication signal, and a determiner that determines, based on the reference signal, the timing of switching a light emitting element from extinction to lighting. The predetermined communication signal is a signal in which the start bit with a first logic level is transmitted at a prescribed period from a transmitter and in which the data bits succeeding each start bit do not have a second logic level a predetermined number of times or more consecutively.

15 Claims, 7 Drawing Sheets

(51) Int. Cl.
*B60Q 1/30* (2006.01)
*H05B 45/10* (2020.01)

(56) References Cited

U.S. PATENT DOCUMENTS

| | | | | |
|---|---|---|---|---|
| 10,285,249 | B2* | 5/2019 | Mason | H05B 47/19 |
| 10,473,315 | B2* | 11/2019 | Riquè Rebull | H05B 47/19 |
| 10,804,725 | B2* | 10/2020 | Onishi | H02J 7/00034 |
| 11,096,253 | B1* | 8/2021 | Mays, II | H05B 45/10 |
| 11,901,744 | B2* | 2/2024 | Onishi | H02J 50/90 |
| 2008/0094005 | A1* | 4/2008 | Rabiner | H05B 47/18 |
| | | | | 315/294 |
| 2008/0136796 | A1* | 6/2008 | Dowling | G06F 3/147 |
| | | | | 345/204 |
| 2008/0164854 | A1* | 7/2008 | Lys | H05B 45/37 |
| | | | | 323/226 |
| 2009/0115347 | A1* | 5/2009 | Nakao | H05B 45/20 |
| | | | | 323/318 |
| 2012/0262093 | A1* | 10/2012 | Recker | H05B 47/19 |
| | | | | 315/307 |
| 2013/0264971 | A1* | 10/2013 | Yeh | H05B 47/19 |
| | | | | 315/312 |
| 2013/0271032 | A1* | 10/2013 | Hua | H05B 45/46 |
| | | | | 315/297 |
| 2014/0097758 | A1* | 4/2014 | Recker | H02J 9/065 |
| | | | | 315/297 |
| 2014/0210342 | A1* | 7/2014 | Zhuang | B60Q 1/085 |
| | | | | 315/79 |
| 2014/0354345 | A1* | 12/2014 | Nagao | H03K 17/162 |
| | | | | 327/380 |
| 2016/0330825 | A1* | 11/2016 | Recker | H05B 47/115 |
| 2017/0101052 | A1* | 4/2017 | Nagao | H05B 45/10 |
| 2017/0223807 | A1* | 8/2017 | Recker | H02J 7/34 |
| 2018/0033785 | A1* | 2/2018 | Nagao | H05B 45/50 |
| 2018/0035512 | A1* | 2/2018 | Nagao | G09G 3/006 |
| 2018/0242432 | A1* | 8/2018 | Mason | H05B 47/19 |
| 2019/0037660 | A1* | 1/2019 | Rucker | H05B 47/16 |
| 2019/0226670 | A1* | 7/2019 | Riquè Rebull | H01H 23/006 |
| 2019/0357330 | A1* | 11/2019 | Lin | H05B 47/105 |
| 2019/0357331 | A1* | 11/2019 | Lin | H05B 47/16 |
| 2020/0275537 | A1* | 8/2020 | Takahashi | H05B 45/325 |
| 2021/0013739 | A1* | 1/2021 | Onishi | H02J 50/12 |
| 2022/0207777 | A1* | 6/2022 | Van Der Zande | H04N 1/407 |
| 2022/0217828 | A1* | 7/2022 | Linnartz | H05B 47/175 |
| 2023/0007757 | A1* | 1/2023 | Nagao | H05B 47/18 |
| 2023/0189409 | A1* | 6/2023 | Xiong | H05B 45/31 |
| | | | | 315/294 |

FOREIGN PATENT DOCUMENTS

| | | |
|---|---|---|
| JP | 2007-311190 | 11/2007 |
| JP | 2007311190 A * | 11/2007 |
| JP | 2011-107259 | 6/2011 |

\* cited by examiner

LIGHT EMITTING ELEMENT DRIVING DEVICE

TECHNICAL FIELD

The present invention relates to a light emitting element driving device.

BACKGROUND ART

Conventionally, a light emitting element driving device having a plurality of channels is known (for example, see Patent Document 1). When a single light emitting element driving device alone cannot provide the desired number of channels, a light emitting system is built using a plurality of light emitting element driving devices.

LIST OF CITATIONS

Patent Literature

Patent Document 1: Japanese Patent Application published as No. 2011-107259.

SUMMARY OF THE INVENTION

Problem to be Solved by the Invention

Here, if on/off control or dimming control is performed channel by channel, a plurality of light emitting element driving devices need to operate in synchronization, because otherwise the light emitting system operates with a light emission pattern different from the desired light emission pattern.

For example, by feeding a common clock signal to the light emitting element driving devices so that they operate based on the clock signal, it is possible to operate the plurality of light emitting element driving devices in synchronization with each other. However, to feed a common clock signal to the light emitting element driving devices, it is necessary to provide each light emitting element driving device with a port for feeding the clock signal to it, and this leads to increased size and cost of the light emitting element driving device.

In view of the circumstances described above, the present invention is aimed at providing a light emitting element driving device that can operate in synchronization with another light emitting element driving device without using a clock signal common to them.

Means for Solving the Problem

According to one aspect of what is disclosed herein, a light emitting element driving device includes a receiver configured to receive a predetermined communication signal transmitted across a communication line, a generator configured to generate a reference signal based on the start time point of a start bit in the predetermined communication signal, and a determiner configured to determine, based on the reference signal, the timing of switching a light emitting element from extinction to lighting. The predetermined communication signal is a signal in which the start bit with a first logic level is transmitted at a prescribed period from a transmitter and in which the data bits succeeding each start bit do not have a second logic level a predetermined number of times or more consecutively (a first configuration).

In the light emitting element driving device according to the first configuration described above, preferably, the generator includes a first detector configured to detect that a period in which the communication line is at the second logic level has continued for a first predetermined time and a second detector configured to detect, as the start time point of the start bit, a first logic appearance time point at which the first logic level appears on the communication line for the first time after the period in which the communication line is at the second logic level has continued for the first predetermined time (a second configuration).

In the light emitting element driving device according to the second configuration described above, preferably, the second detector is configured such that, if the period in which the communication line is at the first logic level does not continue for a second predetermined time after the first logic appearance time point, the second detector exceptionally does not detect the first logic appearance time point as the start time point of the start bit (a third configuration).

In the light emitting element driving device according to the third configuration described above, preferably, the second predetermined time is shorter than the first predetermined time (a fourth configuration).

In the light emitting element driving device according to any of the first to fourth configurations described above, preferably, the predetermined communication signal includes dimming information for the light emitting element (a fifth configuration).

In the light emitting element driving device according to any of the first to fifth configurations described above, preferably, the predetermined communication signal is a UART (universal asynchronous receiver-transmitter) communication signal (a sixth configuration).

According to another aspect of what is disclosed herein, a light emitting system includes a plurality of light emitting element driving devices according to any of the first to sixth configurations, and the light emitting system further includes the communication line, the transmitter, and at least as many light emitting elements as there are light emitting element driving devices (a seventh configuration).

According to yet another aspect of what is disclosed herein, a vehicle includes a light emitting system according to the seventh configuration described above (an eighth configuration).

Advantageous Effects of the Invention

According to the present invention, it is possible to provide a light emitting element driving device that can operate in synchronization with an other light emitting element driving device without using a clock signal common to them.

DESCRIPTION OF EMBODIMENTS

Figure 1:
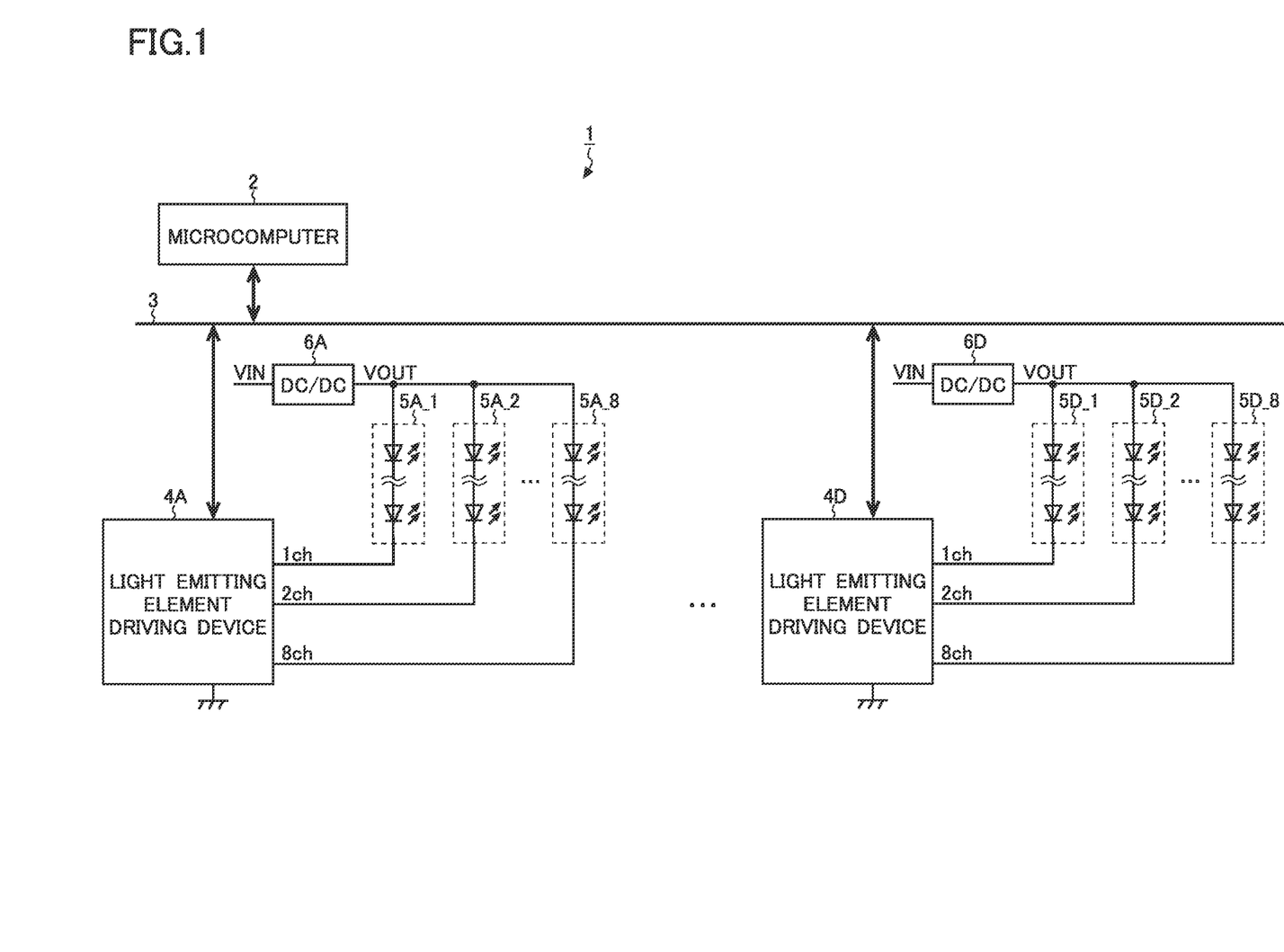
FIG. 1 is a diagram showing a light emitting system according to one embodiment.

FIG. 1 is a diagram showing a light emitting system according to one embodiment. The light emitting system 1 shown in FIG. 1 includes a microcomputer 2, a communication bus 3, light emitting element driving devices 4A to 4D, light emitting element circuits 5A_1 to 5A_8, 5B_1 to 5B_8, 5C_1 to 5C_8, and 5D_1 to 5D_8, and DC-DC converters 6A to 6D.

The microcomputer 2 performs dimming control of respective channels of the light emitting element driving devices 4A to 4D via the communication bus 3. The microcomputer 2 can control the light emitting element driving devices 4A to 4D separately by specifying addresses. When, for example, 2-bit addresses are used, the microcomputer 2 can control a maximum of four light emitting element driving devices separately. When, for example, 3-bit addresses are used, the microcomputer 2 can control a maximum of eight light emitting element driving devices separately.

The microcomputer 2 performs dimming control of the respective channels of the light emitting element driving devices 4A to 4D by controlling the on-duty of PWM (pulse-width modulation). In a modified version of this embodiment, dimming control other than PWM dimming may be used. For example, the microcomputer 2 may perform dimming control by controlling the value of a DC current that passes though the respective channels of the light emitting element driving devices 4A to 4D.

The communication bus 3 is a communication line for transmitting a predetermined communication signal. The predetermined communication signal is a signal in which a start bit with a first logic level is transmitted at a prescribed period from the microcomputer 2 functioning as a transmitter and in which data bits succeeding each start bit do not have a second logic level a predetermined number of times or more consecutively. As the predetermined communication signal, for example, a UART communication signal or the like can be used. In the UART communication signal, the first logic level is low level, and the second logic level is high level.

As the communication bus 3, for example, a CAN (controller area network) bus or the like can be used.

The light emitting element driving device 4A has a first to an eighth channel 1ch to 8ch and drives, for each channel, the light emitting element circuits connected to 1ch to 8ch respectively in accordance with dimming control by the microcomputer 2. To the kth channel kch of the light emitting element driving device 4A, the cathode of the light emitting element circuit 5A_k is connected (where k represents a natural number of 1 or more but 8 or less).

The light emitting element driving devices 4B to 4D have a similar configuration to the light emitting element driving device 4A except the addresses they are assigned.

The light emitting element circuits 5A_k to 5D_k are each a circuit with a plurality of LEDs (light emitting diodes) connected in series. In a modified version of this embodiment, the light emitting element circuits 5A_k to 5D_k may each include one LED. Or, instead of any LED, any other type of light emitting element such as an organic EL (electroluminescence) may be used.

The DC-DC converter 6A converts an input voltage VIN to an output voltage VOUT1 and feeds the output voltage VOUT1 to the anode of the light emitting element circuit 5A_k. The DC-DC converter 6B converts an input voltage VIN to an output voltage VOUT2 and feeds the output voltage VOUT2 to the anode of the light emitting element circuit 5B_k. The DC-DC converter 6C converts an input voltage VIN to an output voltage VOUT3 and feeds the output voltage VOUT3 to the anode of the light emitting element circuit 5C_k. The DC-DC converter 6D converts an input voltage VIN to an output voltage VOUT4 to feed it to the anode of the light emitting element circuit 5C_k. The output voltages VOUT1 to VOUT4 are basically assumed to have an equal voltage value. However, if, for example, the number of light emitting elements that constitute the light emitting element circuit 5A_k is different from the number of light emitting elements that constitute the light emitting element circuit 5B_k, the output voltage VOUT1 and the output voltage VOUT2 may be given different voltage values. In a modified version of this embodiment, at least two of the DC-DC converters 6A to 6D may be integrated together.

Figure 2:
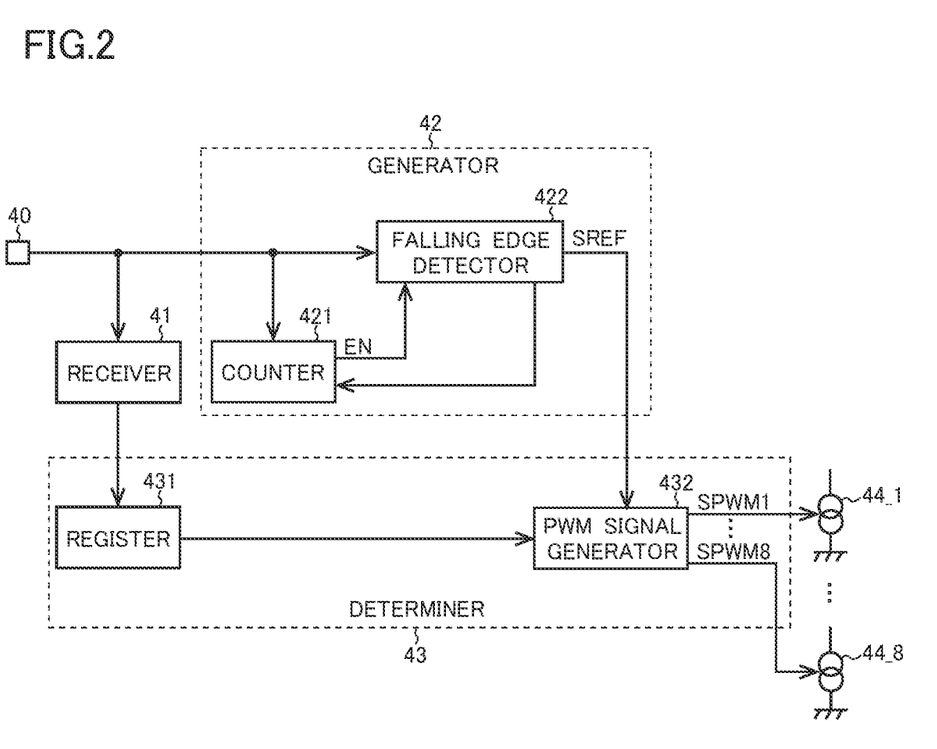
FIG. 2 is a diagram showing one configuration example of the light emitting element driving device.
Figure 3:
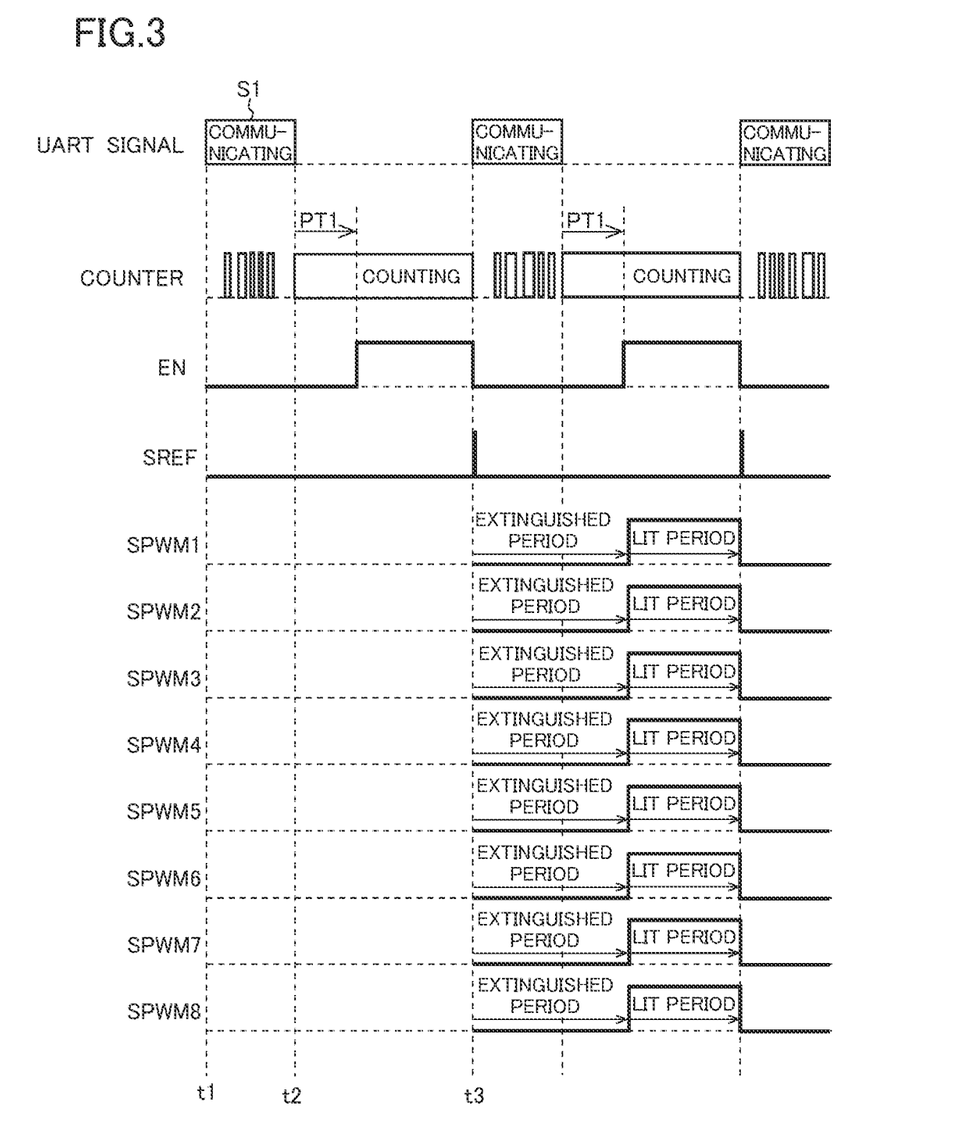
FIG. 3 is a timing chart illustrating the operation of the light emitting element driving device.

Next, with reference to FIGS. 2 and 3, the light emitting element driving device 4A will be described. FIG. 2 is a diagram showing one configuration example of the light emitting element driving device 4A. FIG. 3 is a timing chart illustrating the operation of the light emitting element driving device 4A.

The light emitting element driving device 4A includes a terminal 40, a receiver 41, a generator 42, a determiner 43, and current sources 44_1 to 44_8.

The terminal 40 is connected to the communication bus 3 (see FIG. 1).

The receiver 41 receives the UART communication signal transmitted across the communication bus 3 (see FIG. 1). The receiver 41 stores the address of the light emitting element driving device 4A in a non-volatile manner, extracts information related to the light emitting element driving device 4A from the UART communication signal based on the address of the light emitting element driving device 4A, and stores the extracted information in a register 431 in the determiner 43. In this embodiment, the receiver 41 extracts the PWM dimming on-duty for each channel of the light emitting element driving device 4A.

The receiver 41 in the light emitting element driving device 4B stores the address of the light emitting element driving device 4B in a non-volatile manner. The receiver 41 in the light emitting element driving device 4C stores the address of the light emitting element driving device 4C in a non-volatile manner. The receiver 41 in the light emitting element driving device 4D stores the address of the light emitting element driving device 4D in a non-volatile manner.

The generator 42 generates a reference signal based on the start time point of the start bit in the UART communication signal. The generator 42 includes a counter 421 and a falling edge detector 422.

The counter 421 continues counting while the communication bus 3 (see FIG. 1) is at high level and, when the communication bus 3 (see FIG. 1) turns to low level, stops counting and resets the count value.

The counter 421 senses that the period in which the communication bus 3 (see FIG. 1) is at high level has continued for a first predetermined time PT1. In the UART communication signal, the data bits never have high level nine times or more consecutively; thus, the first predetermined time PT1 is set to be a period in which the data bits have high level nine times consecutively, and the value resulting from dividing the first predetermined time PT1 by the period of an internal clock signal of the light emitting element driving device 4A is used as the threshold value of the count value. Thus, the counter 421 can sense that the UART communication has finished.

On sensing that the period in which the communication bus 3 (see FIG. 1) is at high level has continued for the first predetermined time PT1, the counter 421 turns an enable signal to be fed to the falling edge detector 422 to high level.

The falling edge detector 422, only during a period in which the enable signal is at high level, senses a falling edge, which is a time point when low level appears on the communication bus 3 (see FIG. 1), as the start time point of the start bit in the UART communication. In other words, the falling edge detector 422 detects, as the start time point of the start bit in the UART communication, the time point at which low level appears on the communication bus 3 (see FIG. 1) for the first time after a period when the communication bus 3 (see FIG. 1) has continued being at high level for the first predetermined time PT1.

Then, immediately after the falling edge detector 422 detects the falling edge, the counter 421 switches the enable signal from high level to low level.

The falling edge detector 422 feeds the reference signal SREF, which is a pulse signal that appears at the start time point of the start bit in the UART communication, to a PWM signal generator 432 in the determiner 43.

The determiner 43 determines, based on the reference signal SREF, a time point at which to switch the light emitting element circuits 5A_1 to 5A_8 from off to on. The determiner 43 includes the register 431 and the PWM signal generator 432.

The register 431, as described above, stores the PWM dimming on-duty for each channel of the light emitting element driving device 4A. In this embodiment, the PWM dimming on-duty is expressed by an integer with a set value of 0 or larger but 255 or smaller (i.e., 8-bit data).

The PWM signal generator 432 generates a PWM signal SPWMk (where k represents a natural number of 1 or more but 8 or less) based on the PWM dimming on-duty for the kth channel stored in the register 431 and the reference signal SREF. The PWM signal generator 432 calculates, for example in the period between time points t1 and t2, the lit time for each channel of the light emitting element driving device 4A by using the PWM dimming on-duty for each channel of the light emitting element driving device 4A transmitted by a UART signal S1, and reflects the calculated result after the time point (t3) at which the next pulse appears in the reference signal SREF. Specifically, a shift to the lit time can take place at the time point when an extinguished time (the length of time obtained by subtracting the above lit time from the known period of the UART communication) has elapsed after time point t3. The lit time mentioned above can be calculated by multiplying the period of the UART communication by the above set value and then dividing the result by 255.

The current source 44_k is connected to the cathode of the light emitting element circuit 5A_k (see FIG. 1) and is PWM-driven by the PWM signal SPWMk (where k represents a natural number of 1 or more but 8 or less). When the PWM signal SPWMk is at high level, the current source 44_k is on and drives the light emitting element circuit 5A_k. By contrast, when the PWM signal SPWMk is at low level, the current source 44_k is off and does not drive the light emitting element circuit 5A_k.

As the light emitting element driving device 4A operates as described above and also the light emitting element driving devices 4B to 4D operate in a similar manner to the light emitting element driving device 4A, all the light emitting element driving devices 4A to 4D operate in synchronization with the reference signal SREF. Thus, it is possible, without using a clock signal common to the light emitting element driving devices 4A to 4D, to adapt the light emission pattern of the light emitting system 1 shown in FIG. 1 to a desired light emission pattern (the light emission pattern that the microcomputer 2 instructs the light emitting element driving devices 4A to 4D to use).

Figure 4:
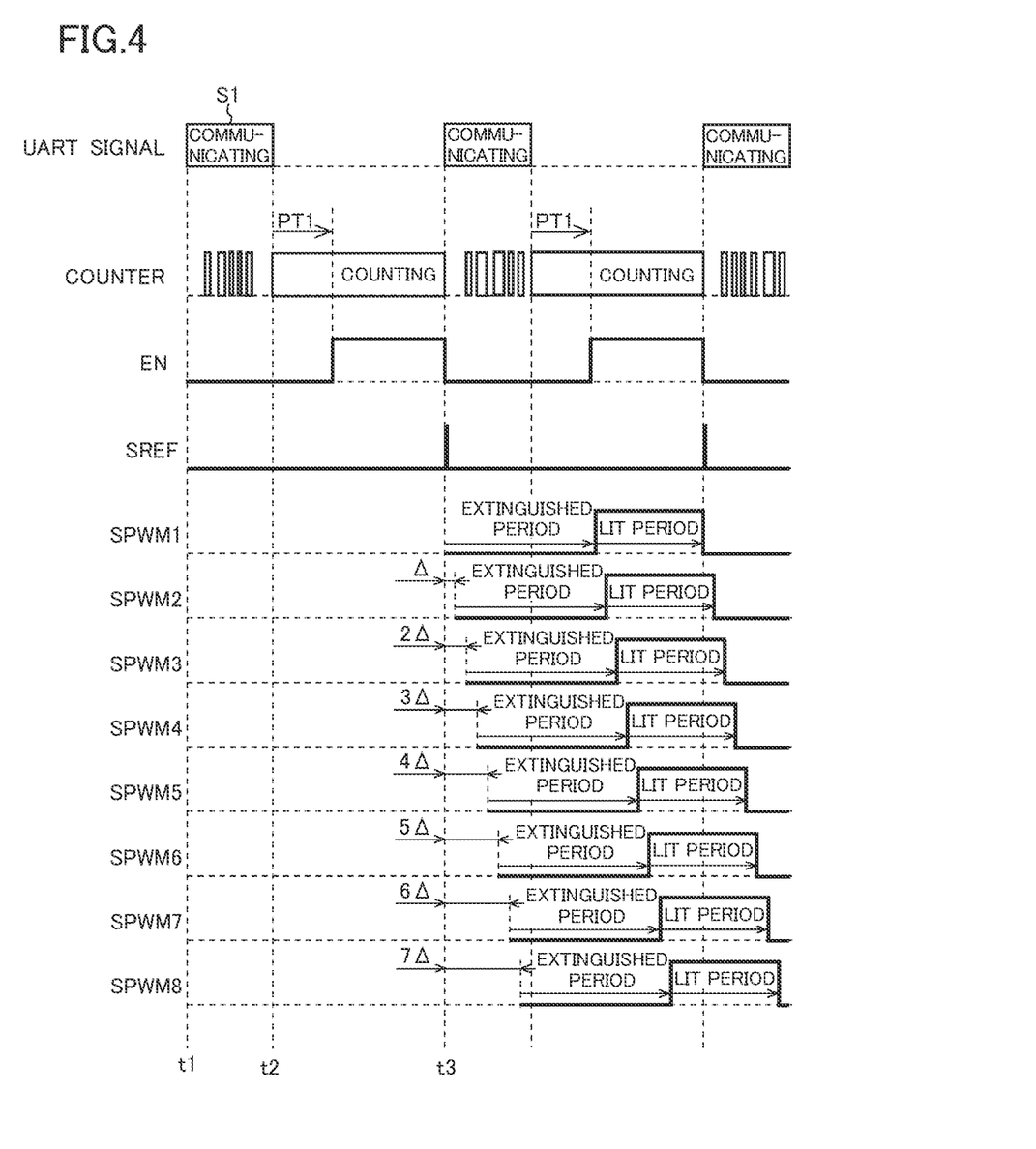
FIG. 4 is another timing chart illustrating the operation of the light emitting element driving device.

Even when the PWM dimming on-duty is equal among the channels, it is not necessary to synchronize the timing of switching from extinction to lighting. For example, as shown in FIG. 4, the timing of switching from extinction to lighting may be shifted by a predetermined shift time A. Although, in FIGS. 3 and 4, the PWM dimming on-duty is equal among channels, needless to say, the PWM dimming on-duty may be different among channels. In addition, it is possible, in each channel, to change the PWM dimming on-duty for each PWM period.

Although the above description deals with a case where there is nothing abnormal in the voltage level of the communication bus 3 (see FIG. 1), there may be a case where something abnormal occurs in the voltage level of the communication bus 3 (see FIG. 1) due to a fault in the microcomputer 2, the effects of noise, etc.

Figure 5:
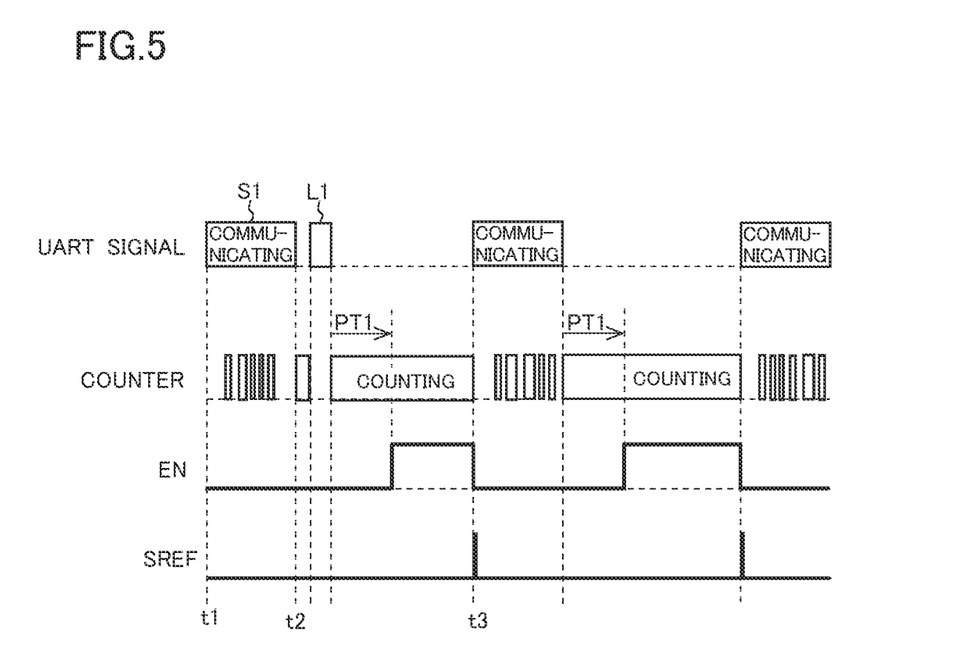
FIG. 5 is yet another timing chart illustrating the operation of the light emitting element driving device.

For example, if a period L1 in which the communication bus 3 (see FIG. 1) turns to low level occurs before the first predetermined time PT1 elapses after the end of the communication of the UART signal S1, the generator 42 does not erroneously recognize the stat time point of the period L1 as the start time point of the start bit in the UART signal (see FIG. 5).

However, if the period L1 in which the communication bus 3 (see FIG. 1) turns to low level occurs after the first predetermined time PT1 has elapsed after the end of the communication of the UART signal S1, the generator 42 erroneously recognizes the start time point of the period L1 as the start time point of the start bit in the UART signal.

To prevent such erroneous recognition, a configuration is possible where, when the period in which the communication bus 3 (see FIG. 1) is at low level does not continue for a second predetermined time after the time point at which low level appears on the communication bus 3 (see FIG. 1), the falling edge detector 422, as an exception, does not detect the time point at which low level appears on the communication bus 3 (see FIG. 1) as the start time point of the start bit in the UART communication. For example, a filter circuit that can eliminate a low level signal that only lasts for the second predetermined time or shorter can be provided in the falling edge detector 422.

The second predetermined time is set to be shorter than the first predetermined time PT1 described above. More specifically, the second predetermined time is set to be shorter than the low level period of the communication bus 3 (see FIG. 1) that corresponds to the start bit in the UART communication. Otherwise, the start time point of the start bit in the UART communication cannot be detected correctly.

Figure 6:
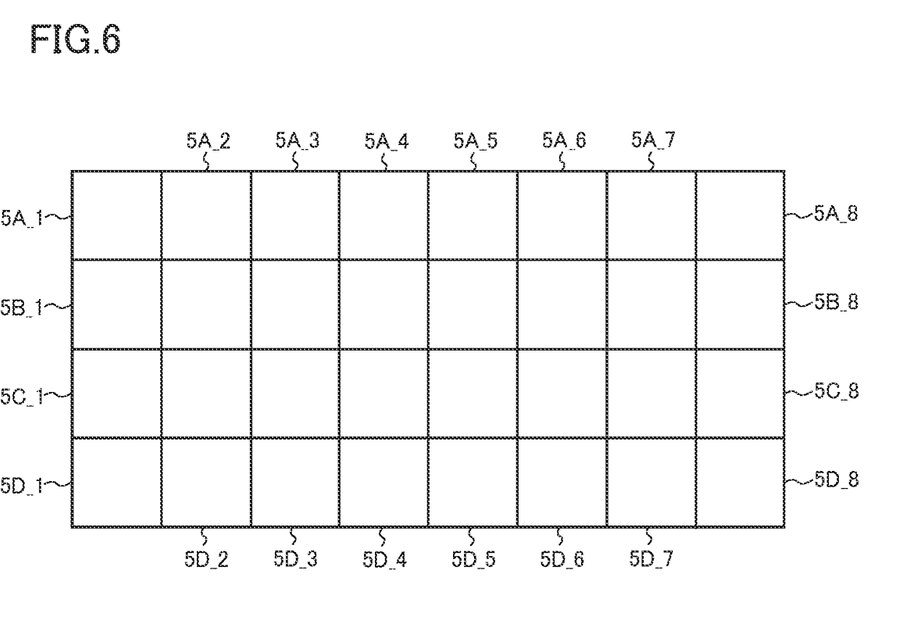
FIG. 6 is a diagram showing an example of arrangement of light emitting element circuits.

While there is no particular limitation on the arrangement of the light emitting element circuits 5A_1 to 5A_8, 5B_1 to 5B_8, 5C_1 to 5C_8, and 5D_1 to 5D_8, arranging them, for example, in a matrix as shown in FIG. 6 permits the light emitting system 1 shown in FIG. 1 to display an animated 8×4 dot picture.

Figure 7:
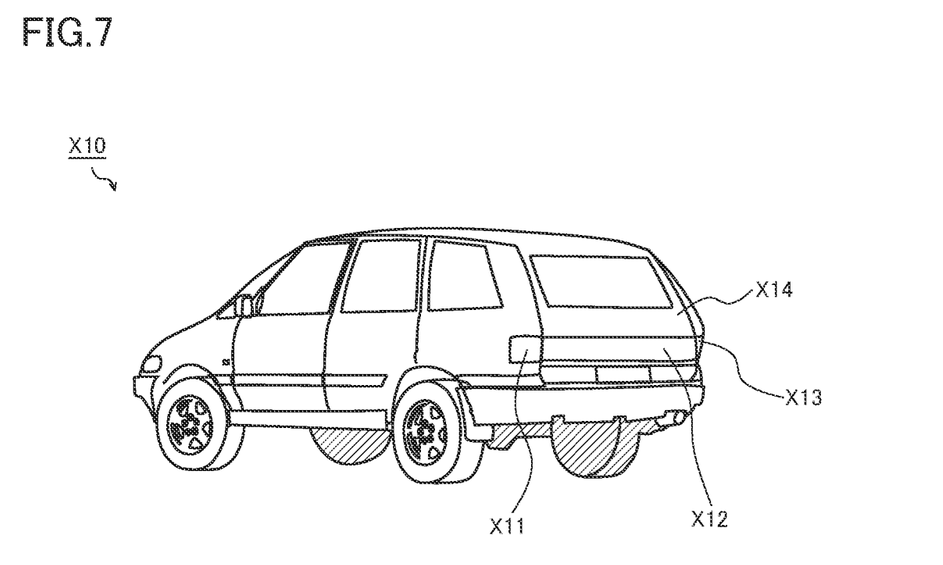
FIG. 7 is an exterior view of a vehicle.

While there is no particular limitation on the use of the light emitting system shown in FIG. 1, it can be applied to, for example, a vehicle X10 as shown in FIG. 7. The vehicle X10 includes display portions X11 to X13. The display portion X11 is provided at the rear left end of the vehicle X10, the display portion X12 is provided in a lower part of a hatchback door X14 of the vehicle X10, and the display portion X13 is provided at the rear right end of the vehicle X10. For example, by using the light emitting element circuits 5A_1 to 5A_8 as the display portion X11, the light emitting element circuits 5B_1 to 5B_8 and the light emitting element circuits 5C_1 to 5C_8 as the display portion X12, and the light emitting element circuits 5D_1 to 5D_8 as the display portion X13, even though the display portions X11 and X12 are physically separated by the hatchback door X14 and the display portions X12 and X13 are physically separated by the hatchback door X14, integral display is possible with the display portions X11 to X13.

The present invention can be implemented in any manner other than as in the embodiments described above, with any modifications made within the sense of the present invention. The embodiments disclosed herein should be considered to be in every aspect illustrative and not restrictive, and the technical scope of the present invention is defined not by the description of embodiments given above but by the scope of the appended claims and should be understood to encompass any modifications within a sense and scope equivalent to the claims.

LIST OF REFERENCE SIGNS 1 light emitting system
2 microcomputer
3 communication bus
4A to 4D light emitting element driving device
5A_1 to 5A_8 light emitting element circuit
5B_1 to 5B_8 light emitting element circuit
5C_1 to 5C_8 light emitting element circuit
5D_1 to 5D_8 light emitting element circuit
6A to 6D DC-DC converter
40 terminal
41 receiver
42 generator
421 counter
422 falling edge detector
X10 vehicle
X11 to X13 display portion
X14 hatchback door

The invention claimed is:

1. A light emitting element driving device comprising:
a receiver configured to receive a predetermined communication signal transmitted across a communication line;
a generator configured to generate a reference signal based on a start time point of a start bit in the predetermined communication signal; and
a determiner configured to determine, based on the reference signal, timing of switching a light emitting element from an OFF state to an ON state,
wherein the predetermined communication signal is a signal in which the start bit with a first logic level is transmitted at a prescribed period from a transmitter and in which data bits succeeding each start bit do not have a second logic level a predetermined number of times or more consecutively,
wherein the generator includes
a first detector configured to detect that a period during which the communication line is at the second logic level has continued for a first predetermined time, and
a second detector configured to detect, as the start time point of the start bit, a first logic appearance time point at which the first logic level appears on the communication line for a first time after the period in which the communication line is at the second logic level has continued for the first predetermined time,
wherein the second detector is configured such that, if the period in which the communication line is at the first logic level does not continue for a second predetermined time after the first logic appearance time point, the second detector exceptionally does not detect the first logic appearance time point as the start time point of the start bit.

2. The light emitting element driving device according to claim 1,
wherein the second predetermined time is shorter than the first predetermined time.

3. The light emitting element driving device according to claim 1,
wherein the predetermined communication signal includes dimming information for the light emitting element.

4. The light emitting element driving device according to claim 1,
wherein the predetermined communication signal is a UART (universal asynchronous receiver-transmitter) communication signal.

5. A light emitting system comprising a plurality of the light emitting element driving devices according to claim 1, the light emitting system further comprising:
the communication line;
the transmitter; and
at least as many of the light emitting elements as there are the light emitting element driving devices.

6. A vehicle comprising the light emitting system according to claim 5.

7. An LED dimming control device comprising a receiver configured to receive a predetermined communication signal transmitted across a communication line, the LED dimming control device being configured to perform programmable PWM dimming on individual LEDs using an internal PWM clock signal,
wherein
the predetermined communication signal is a UART communication signal, with each UART frame in a serial interface composed of one start bit and data bits,
the internal PWM clock signal is adjusted by the predetermined communication signal,
the predetermined communication signal is a signal in which a start bit with a first logic level is transmitted at a prescribed period from a transmitter and, as data bits succeeding each start bit, a signal with a second logic level is transmitted a predetermined number of times consecutively.

8. The LED dimming control device according to claim 7, further comprising:
a first terminal configured to have a cathode of a first LED externally connected thereto;
a second terminal configured to have a cathode of a second LED externally connected thereto; and
a third terminal configured to have a cathode of a third LED externally connected thereto.

9. The LED dimming control device according to claim 8, wherein the first, second, and third LEDs are individually subjected to dimming control.

10. The LED dimming control device according to claim 8, further comprising a register configured to set an on-duty of the LEDs.

11. The LED dimming control device according to claim 7, wherein an on-timing of the internal PWM clock signal is changed every prescribed period.

12. The LED dimming control device according to claim 7, wherein
the communication line is a CAN, and
the LED dimming control device includes a terminal configured to have a bus of the CAN connected thereto.

13. An LED system comprising:
the LED dimming control device according to claim 9; and
the LEDs.

14. A vehicle comprising the LED system according to claim 13.

15. A light emitting element driving device comprising:
a receiver configured to receive a predetermined communication signal transmitted across a communication line;
a generator configured to generate a reference signal based on a start time point of a start bit in the predetermined communication signal; and
a determiner configured to determine, based on the reference signal, timing of switching a light emitting element from OFF state to ON state,
wherein the predetermined communication signal is a signal in which the start bit with a first logic level is transmitted at a prescribed period from a transmitter and in which data bits succeeding each start bit do not have a second logic level a predetermined number of times or more consecutively,
wherein the generator includes:
a detector configured to detect, as the start time point of the start bit, a first logic appearance time point at which the first logic level appears on the communication line for a first time after the period in which the communication line is at the second logic level has continued for a first predetermined time,
wherein the detector is configured such that, if the period in which the communication line is at the first logic level does not continue for a second predetermined time after the first logic appearance time point, the detector exceptionally does not detect the first logic appearance time point as the start time point of the start bit.

* * * * *